United States Patent [19]

Caraway

[11] 4,214,428
[45] Jul. 29, 1980

[54] RAKING AND BALING MACHINE

[76] Inventor: Robert O. Caraway, Hwy. 109, Meansville, Ga. 30256

[21] Appl. No.: 952,348

[22] Filed: Oct. 18, 1978

[51] Int. Cl.$^2$ ............... A01D 77/00; A01D 89/00; A01D 87/12

[52] U.S. Cl. ............................................ 56/341; 56/377

[58] Field of Search ................. 56/341, 377, 342, 343

[56] References Cited

U.S. PATENT DOCUMENTS

| | | | |
|---|---|---|---|
| 1,081,624 | 12/1913 | Palmer | 56/341 |
| 2,683,345 | 7/1954 | Meyer | 56/377 |
| 2,731,782 | 1/1956 | Mason | 56/377 X |
| 2,993,328 | 7/1961 | van der Lely et al. | 56/377 |
| 3,177,641 | 4/1965 | Powell et al. | 56/341 |
| 3,914,928 | 10/1975 | Weaver | 56/377 |

Primary Examiner—Russell R. Kinsey
Attorney, Agent, or Firm—D. Paul Weaver

[57] ABSTRACT

During a single pass, cut hay or grain in a twenty foot wide swath is cleared by the action of a pair of multi-wheel divergent rakes coupled to the front end of a wide wheel farm tractor. The two rakes produce a single five foot wide windrow of hay or grain over which the tractor can pass, and a conventional round baler towed by the tractor produces round bales which are deposited in the field behind the machine. The necessity for separate raking and baling passes utilizing separate tractors is eliminated. The front-mounted rakes can be hoisted and folded to facilitate roadway transport.

11 Claims, 6 Drawing Figures

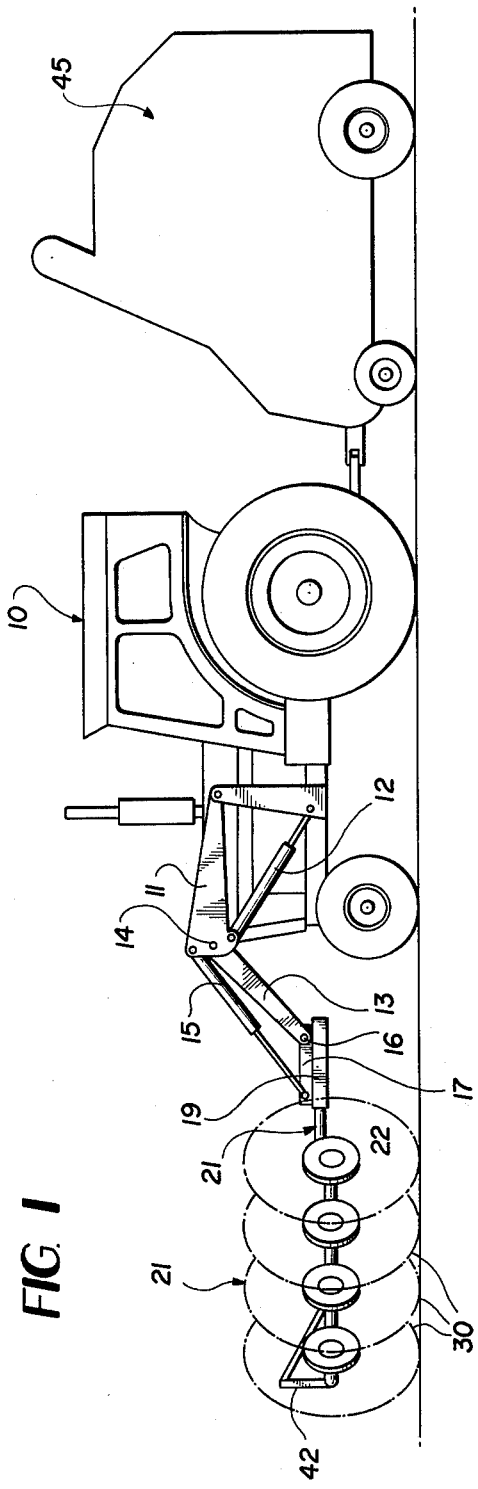
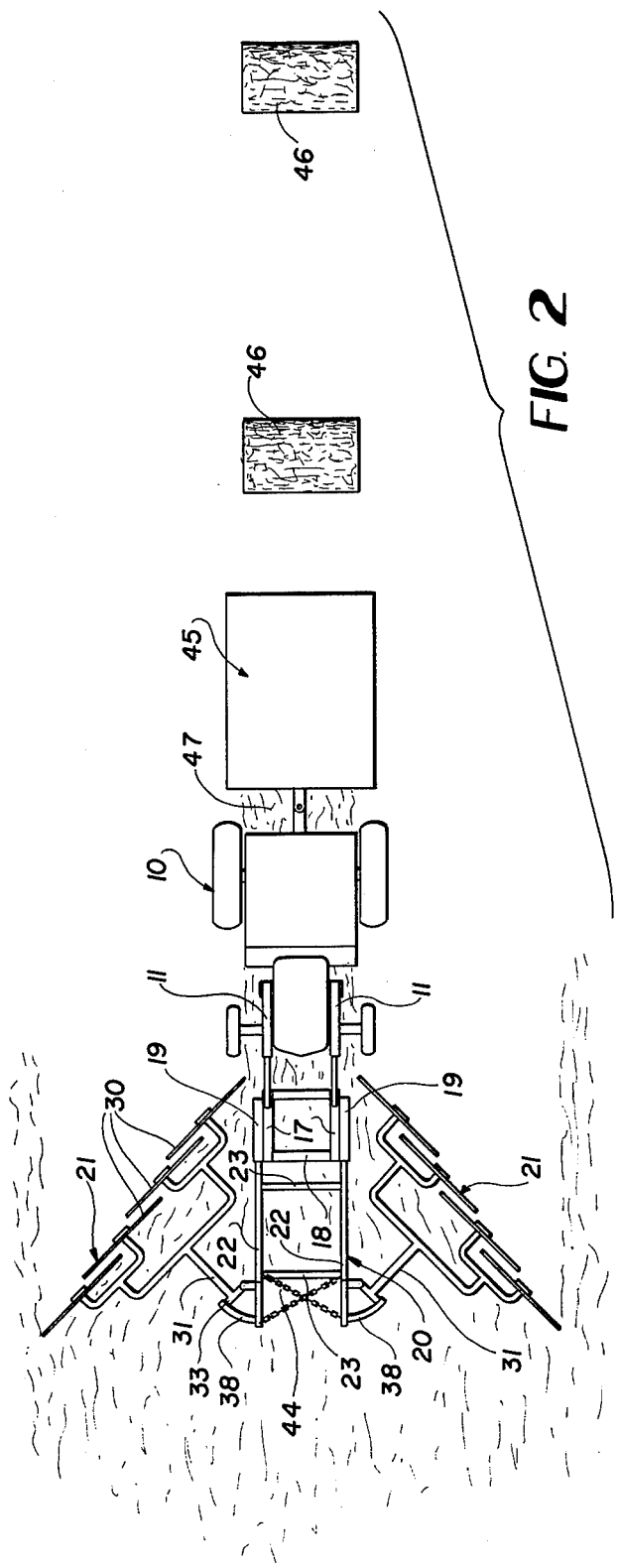

RAKING AND BALING MACHINE

BACKGROUND OF THE INVENTION

Currently, cut hay is raked into a windrow by the operation of a rear mounted tractor carried rake. Two raking passes over the cut grain are required to produce the desired windrow and this is followed by a third pass with a baler to produce bales from the windrowed hay or grain. Actually, the current complete process of harvesting hay requires at least five passes, namely, two cutting passes, two raking and one baling pass to clear a twenty foot wide swath. Each one of these passes involves the use of a tractor. When the present invention is utilized, a total of only three passes is involved in harvesting hay, two cutting passes and a single raking and baling pass when the hay is sufficiently dry. The economic advantage of the invention over the prior art is considerable and will be recognized by anyone skilled in the art.

To comply with the disclosure requirements under 37 C.F.R. 1.56, the following prior U.S. Pat. Nos. are made of record herein:

| | |
|---|---|
| 2,893,192 | 3,145,522 |
| 2,977,743 | 3,910,019 |
| 3,135,082 | 4,047,370 |
| 4,077,189 | |

SUMMARY OF THE INVENTION

A hay raking and baling machine consists essentially of a standard wide wheel farm tractor which tows behind it a standard round baler. The tractor is equipped at its front with a front end loader attachment on which is mounted for purposes of the invention the frame of a Tennessee bale spear. A pair of side longitudinal sleeves fixedly secured to the latter frame serve as the mounting means for a generally H-shaped support for twin divergent multiwheel hay rakes disposed in advance of the tractor. The two rakes can be modifications of commercially available four-wheel finger wheel rakes of the type manufactured and sold by Massey-Ferguson and others. The two rakes are independently swingable on divergent adjustable pivot mounts and are also swingable around the parallel longitudinal axes of their main support arms which have swiveled engagement with the side members of the H-shaped support. The two rakes are restrained by chains while in their deployed positions and are spring buffered. They are also elevatable and foldable in roadway transport positions where they are lashed safely by said chains.

Other constructional and operational features of the invention will become apparent in the following description.

BRIEF DESCRIPTION OF THE DRAWINGS

FIG. 1 is a partly schematic side elevation of a raking and baling machine according to the invention.

FIG. 2 is a plan view of the machine.

DETAILED DESCRIPTION

Figure 3:
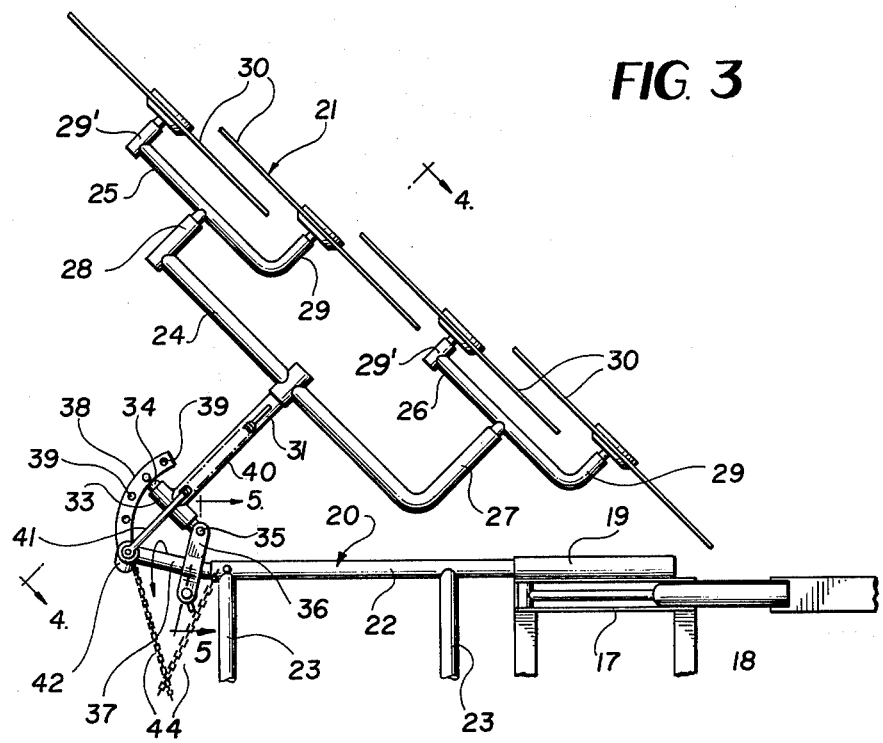
FIG. 3 is an enlarged fragmentary plan view of one front mounted rake and associated elements.
Figure 4:
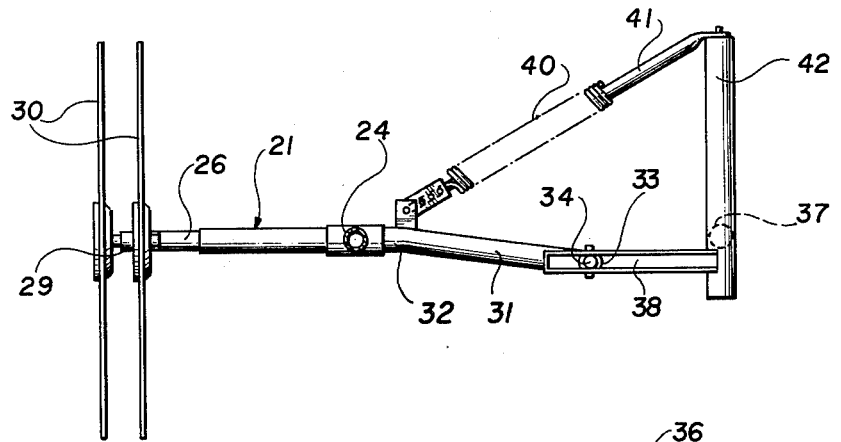
FIG. 4 is an enlarged fragmentary vertical section taken on line 4—4 of FIG. 3.

Referring to the drawings in detail wherein like numerals designate like parts, the numeral 10 designates a conventional wide wheel farm tractor equipped with a front end loader attachment which includes vertically swingable lift arms 11 operated by cylinders 12. The conventional front end loader attachment additionally includes lift arm extensions 13 pivoted at 14 to the arms 11 and normally carrying a front end loader bucket which has been removed from the attachment for purposes of this invention. Additional lift cylinders 15 above the arm extensions 13 are also normally coupled to the forward side of the front end loader bucket. In lieu of this bucket, the arm extensions 13 have their leading ends pivotally connected at 16 to the rearward ends of channel members 17 carried by the opposite sides of a horizontal frame 18. The frame 18 forms the primary support and lifting means for front-mounted hay windrowing rakes and associated parts, to be described.

The frame 18 carries on opposite sides thereof and rigidly attached thereto a pair of parallel longitudinal sleeves 19 which forms the supports for another horizontal frame or carrier 20 on which the two windrowing rake assemblies 21 of the invention are adjustably mounted. More particularly, the windrow rake support frame 20 is of ladder-like construction consisting of a pair of parallel longitudinal side members 22 whose rear ends are socketed telescopically within the two sleeves 19. The members 22 are preferably removably held in the sleeves 19 by suitable pins or bolts, not shown, which can be removed at proper times to allow separation of the frame 20 from the support sleeves 19. The frame 20 further includes rigid crossbraces 23, as illustrated. It will be understood that the windrow rake support frame 20 and all parts carried thereby can be raised and lowered by the action of the lift arms 11 and can also be tilted by the coaction of the cylinders 15 and arm extensions 13. These elements operate in a known manner as they are derived from a standard front end loader tractor attachment, as previously explained.

The two windrow rake assemblies 21 carried on the frame 20 are preferably a slightly modified version of two Massey-Ferguson four wheel fingerwheel rakes. Essentially the same rake is manufactured and sold by Vicon Farm Machinery, Inc., 3731 Cook Blvd., Chesapeake, Va. 23323, under the designation Vicon Trapeze V-Rake.

Each rake assembly 21 comprises a main U-frame 24 carrying two smaller U-frames 25 and 26 at its opposite ends. The arm 27 of each main U-frame 24 is somewhat longer than the opposite arm 28 thereof. Similarly, the corresponding arms 29 of the smaller U-frames 25 and 26 are longer than the opposite side arms 29' of the smaller U-frames. A pair of fingerwheel rakes 30 are freely rotatably mounted on the respective arms of U-frames 25 and 26 so that the planes of rotation of the fingerwheels are staggered equidistantly and parallel. Each main U-frame 24 is secured fixedly to a substantially right angular support arm 31 having a slight bend 32 near its point of connection with the main U-frame 24, FIG. 6, to assure proper locating of the two rake assemblies 21 relative to the ground during operation.

The opposite ends of the support arms 31 are connected to pivot sleeves 33, freely rotatable on pins 34 having axes at right angles to the support arms 31. Each pin 34 has one end pivotally connected at 35, FIG. 5, to a clamping bracket 36 which tightly embraces a longitudinal tube 37 engaging telescopically within one of the side members 22 of rake support frame 20. Each tube 37 is coaxial with its supporting tube member 22 and freely rotatable therein, as indicated by the arrow in FIG. 3. Thus, there is a double hinge or swing joint for each windrowing rake assembly 21 about the axes of the pin 34 and tube 37.

Additionally, each pivot pin 34 is adjustably secured to an arcuate support arm 38 on the leading end of tube 37 and rigid therewith. The support arm 38 has a series of openings 39 formed therethrough through which a pin or bolt may be placed for passage through a registering opening in the pin 34 enabling the angle of each arm 31 to be adjusted angularly. By this means, the included angle between the fingerwheel rakes 30 of the two rake assemblies 21 can be adjusted.

Figure 5:
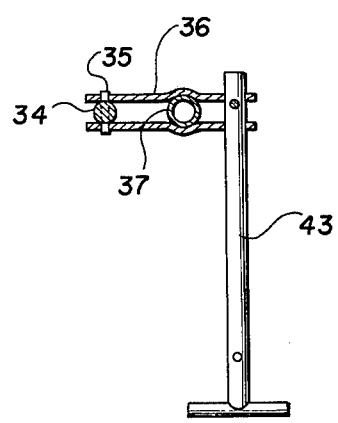
FIG. 5 is a similar section taken on line 5—5 of FIG. 3.

Each arm 31 and thus each rake assembly 21 is biased upwardly about pin 34 by a retractile spring 40 having its lower end coupled to the arm 31 near the main U-frame 24 and its upper end coupled through a rod extension 41 to the top of a generally upright mast 42 rising from the juncture of the arcuate support arm 38 and longitudinal tube 37. A leg or jackstand 43 secured adjustably to each clamping bracket 36, FIG. 5, is shiftable to a lowered use position for lending support to the assembly 21 on the ground when the machine is at rest. The jackstand can be raised and locked in an elevated position when the machine is actively used for raking and baling hay.

During usage, the downward movement of the raking assemblies 21 due to rotation about the axes of the tubes 37 is restrained at a predetermined limit by a pair of crossing chains 44 whose respective outer and upper ends are secured to the tops of masts 42 while their respective inner and lower ends are secured to the leading ends of side members 22 of frame 20. When the rake assemblies 21 are elevated by action of the front end loader mechanism on the tractor 10, the taut chains 44 will prevent the assemblies 21 from rotating downwardly beyond predetermined limits. The chains do not interfere with upward swinging movement of the two rake assemblies. The arrangement and operation of the two chains 44 and associated elements is best shown in FIG. 6.

Subject to the described adjustments, the twin multi-wheel forwardly divergent windrowing rake assemblies 21 precede the tractor 10 while moving over a field of cut hay or the like. The two rake assemblies together will clear a swath up to twenty feet wide cleanly and deliver all of the hay into a well defined single five foot wide windrow over which the wide wheeled tractor can pass, as shown in FIG. 2. The tractor 10 tows behind it conventional round baler 45 which automatically forms and discharges the well known round bales 46 as it travels along the windrowed hay 47 and acts on the same in a manner well known in the art. Thus, in a single pass, the machine embodying the invention clears a wide swath of hay, windrows it and bales the hay, as described. There is no necessity for separate raking and baling passes over the field and at least one tractor is eliminated and other economies are affected, as previously discussed under the "Background of the Invention". It should be mentioned that in normal raking operation, the frame 20 is held at an elevation of about one yard above the ground by the tractor front end loader attachment and, at this time, the chains 44 will be taut to prevent the tips of the rake finger-wheels 30 from touching solid ground. The finger-wheels are enabled to act on the cut hay with a very effective and light clean sweeping action so that very little hay or grain is wasted.

The entire rake-tractor-baler machine can be transported on a single flat bed trailer, thus lowering transportation costs to the site of harvesting. The chains 44 serve a dual purpose in the invention, namely, to provide support to the assemblies 21 while in the raking mode, as described, and as a safety means to secure the assemblies 21 in upwardly folded positions during transport on a roadway. The folding and unfolding of the rake assemblies 21 could be done by hydraulics, but in the present embodiment of the invention is accomplished by one man in approximately two minutes' time. In the roadway transportation mode, the chains 44 can be wrapped around the support arms 31 of the rakes to hold them properly elevated. Placing the apparatus in the transportation mode may be briefly summarized as follows. The tractor front end loader mechanism is lowered so that the springs 40 have their tension relieved. A keeper bolt is placed through an opening and spring arm on both sides. The pins that connect the pivot elements 34 to arcuate support arms 38 are removed on both sides of the machine. The front end loader arms are adjusted until the frame 20 is generally upright. The chains 44 are detached. The right-hand side rake 21 (viewing the machine from the front) is rotated clockwise until the main arm 31 touches the adjacent frame bar 22 and is then lashed in this position with one chain. The main arm 31 of the opposite side rake assembly is then similarly attached to the other side of the frame 20 in a similar manner.

Figure 6:
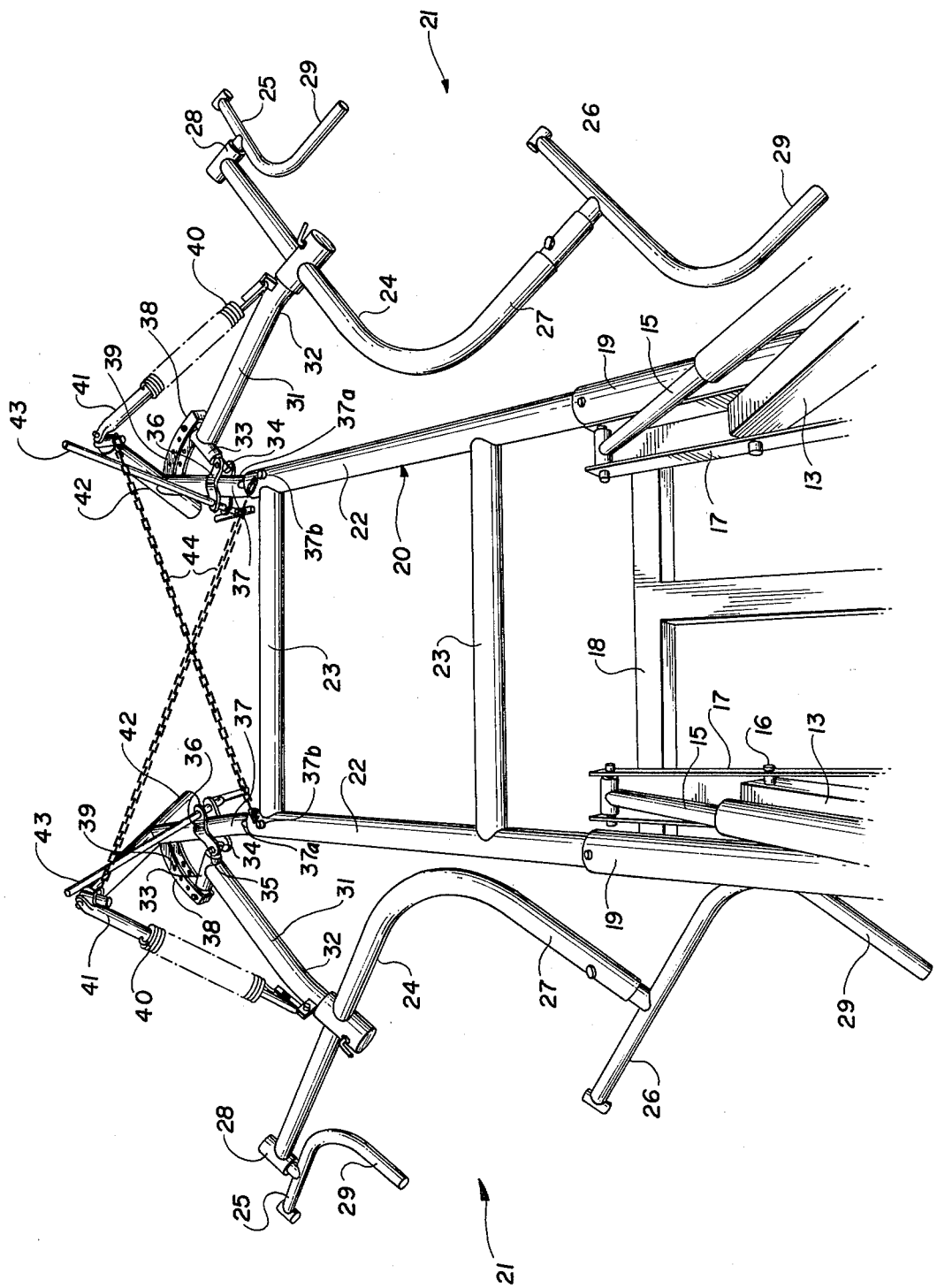
FIG. 6 is a perspective view of supporting means for the two windrowing rakes.

It should also be noted, with reference to FIG. 6, that a pair of small stop lugs 37a are formed on the tubes or arms 37 to limit the extent to which they can telescope into the members 22. Also, a pair of retainer bolts or pins 37b in the members 22 pass through circumferential slots in the tubes 37, which slots allow these tubes to rotate 90 degrees but limit further rotation.

Various advantages of the invention, as well as economies, over the prior art are achieved as will now be apparent to those skilled in the art.

It is to be understood that the form of the invention herewith shown and described is to be taken as a preferred example of the same, and that various changes in the shape, size and arrangement of parts may be resorted to without departing from the spirit of the invention or scope of the subjoined claims.

I claim:

1. A raking and baling apparatus comprising a tractor, a baler coupled with the rear of the tractor and moving therewith, a power lift means on the front of the tractor including an implement support, a pair of multi-wheel fingerwheel rake assemblies connected with and carried by said implement support with the fingerwheels of each rake assembly disposed generally in a plane which is at an acute angle to the path of movement of the apparatus and with the two planes of the fingerwheels of the two rake assemblies diverging forwardly for the purpose of clearing a wide swath extending on opposite sides of the apparatus and producing a single windrow of material cleared from said swath having a width sufficiently narrow to pass between the wheels of the tractor and be acted on rearwardly of the tractor by said baler during a single pass of the apparatus over a field, and said power lift means on the front of the tractor comprising a front end loader attachment including articulated lift arms, cylinder means to raise and lower the articulated lift arms, and additional cylinder means connected to and moving with said arms, a normally level frame coupled with one pair of said arms near the rear of said frame and coupled with said additional cylinder means near the front of said frame, said implement support comprising an additional frame coupled with the last-named frame and extending forwardly thereof, and said rake assemblies each having a primary support arm pivoted to one side of said additional frame near the front thereof and at an acute angle thereto, the primary support arms diverging rearwardly and being substantially normal to said planes.

2. A raking and baling apparatus as defined in claim 1, and a pair of spaced parallel sleeves fixed on said normally level frame and extending longitudinally of the apparatus, said additional frame having a pair of side longitudinal members which are socketed within said sleeves.

3. A raking and baling apparatus as defined in claim 1, and means on said additional frame and carrying said primary support arms so that the pivot axes of the primary support arms may have their angular relationships to the longitudinal sides of said additional frame adjusted.

4. A raking and baling apparatus as defined in claim 3, and flexible substantially non-stretchable restraining means coupled between said additional frame and said rake assemblies to limit rotation of the assemblies in one direction about the axes of the longitudinal side members of the additional frame, each rake assembly including a member having a swiveled connection with one side member of the additional frame.

5. A raking and baling apparatus as defined in claim 4, and additional means interconnecting the primary support arms and the side longitudinal members of said additional frame to limit rotation of the primary support arms in the direction opposite to that limited by said non-stretchable restraining means.

6. A raking and baling apparatus comprising a tractor, a baler coupled with the rear of the tractor and moving therewith, a power lift means on the front of the tractor including an implement support, a pair of multi-wheel fingerwheel rake assemblies connected with and carried by said implement support with the fingerwheels of each rake assembly disposed generally in a plane which is at an acute angle to the path of movement of the apparatus and with the two planes of the fingerwheels of the two rake assemblies diverging forwardly for the purpose of clearing a wide swath extending on opposite sides of the apparatus and producing a single windrow of material cleared from said swath having a width sufficiently narrow to pass between the wheels of the tractor and be acted on rearwardly of the tractor by said baler during a single pass of the apparatus over a field, and said rake assemblies being pivotally supported by said implement support on compound axis pivots with a first pivot axis of each rake assembly extending longitudinally of the apparatus and a second pivot axis of each rake assembly extending at an acute angle to the path of movement of the apparatus, the second pivot axes of the rake assemblies diverging forwardly.

7. A raking and baling apparatus as defined in claim 6, and means connected between each rake assembly and the implement support to limit and restrain pivoting of the assemblies in one direction on said first pivot axes.

8. A raking and baling apparatus as defined in claim 7, and said means connected between each rake assembly and the implement support comprising a pair of crossing chains having corresponding ends anchored to opposite sides of the implement support, rising masts on the rake assemblies near opposite sides of the implement support, and the other corresponding ends of the crossing chains being secured to said masts near the tops thereof.

9. A raking and baling apparatus as defined in claim 8, and retractile spring means connected between the tops of said masts and points on the rake assemblies near the elevation of the implement support and the bases of the masts, the axes of said spring means being inclined.

10. A raking and baling apparatus as defined in claim 6, and adjustable rigid leg means on said rake assemblies adapted to be lowered into contact with the ground to bear the weight of the assemblies when they are at rest.

11. A raking and baling apparatus comprising in combination a wide wheel farm tractor adapted to straddle a windrow of cut material up to five feet wide, a baler of the type which can produce large circular bales coupled with and drawn behind said tractor, power implement lift means on the front of the tractor including an implement support frame which is normally level and projects well forwardly of the tractor, and a pair of multi-wheel fingerwheel rake assemblies carried by said implement support frame with the fingerwheels of each rake assembly disposed generally in a plane which is at an acute angle to the path of movement of the apparatus and with the two planes of the fingerwheels of the two rake assemblies diverging forwardly of the tractor to produce said windrow, and means forming a compound axis pivotal connection between each rake assembly and said implement frame.

* * * * *